United States Patent [19]
Kenyon et al.

[11] Patent Number: 5,814,419
[45] Date of Patent: Sep. 29, 1998

[54] ALKALINE MANGANESE DIOXIDE ELECTROCHEMICAL CELL HAVING COATED CAN TREATED WITH SODIUM SILICATE

[75] Inventors: Kenneth Harry Kenyon, Verona; Joseph L. Passaniti, Fitchburg, both of Wis.

[73] Assignee: Rayovac Corporation, Madison, Wis.

[21] Appl. No.: 522,849

[22] Filed: Sep. 1, 1995

[51] Int. Cl.$^6$ .............................. H01M 6/08; H01M 2/02
[52] U.S. Cl. ........................ 429/165; 429/169; 429/174; 429/176; 429/206
[58] Field of Search ................................... 429/165, 176, 429/169, 206, 174

[56] References Cited

U.S. PATENT DOCUMENTS

| | | | |
|---|---|---|---|
| 3,066,179 | 11/1962 | Ruben | 136/83 |
| 3,156,749 | 11/1964 | Hosfield | 264/161 |
| 3,485,675 | 12/1969 | Ruben | 136/83 |
| 3,663,301 | 5/1972 | Ralston et al. | 136/107 |
| 3,764,392 | 10/1973 | Kuwazaki et al. | 136/107 |
| 3,770,505 | 11/1973 | Bergum et al. | 136/10 |
| 4,011,103 | 3/1977 | Kordesch | 429/66 |
| 4,060,670 | 11/1977 | Tamminen | 429/154 |
| 4,098,967 | 7/1978 | Biddick et al. | 429/210 |
| 5,447,809 | 9/1995 | Hafner et al. | 429/165 |
| 5,487,960 | 1/1996 | Tanaka | 429/218 |

FOREIGN PATENT DOCUMENTS

| | | |
|---|---|---|
| 4225142 | 12/1967 | Japan . |
| 52112731 | 9/1977 | Japan . |
| 4836183 | 3/1983 | Japan . |
| 59138069 | 8/1984 | Japan . |
| 59146164 | 8/1994 | Japan . |

*Primary Examiner*—John S. Maples
*Attorney, Agent, or Firm*—Quarles & Brady

[57] ABSTRACT

The performance characteristics of alkaline manganese dioxide cells are improved by applying a thin, polymeric coating to the inner surface of an unplated steel positive current collector, and treating the current collector with an aqueous solution of sodium silicate before or after the coating is applied to the inner surface. Silicic acid may also be added to the coating before its application to the inner surface of the current collector. In either embodiment of the invention, sodium silicate or silicic acid may also be added to the cathode mixture. The polymeric coating comprises, in combination, a first film forming binder component and a second component comprising an electrically conductive component such as carbon or a filler. The combination of the coating and the sodium silicate or silicic acid treatment of the current collector reduces the internal resistance of the cell, and may even be used on unplated steel.

21 Claims, 17 Drawing Sheets

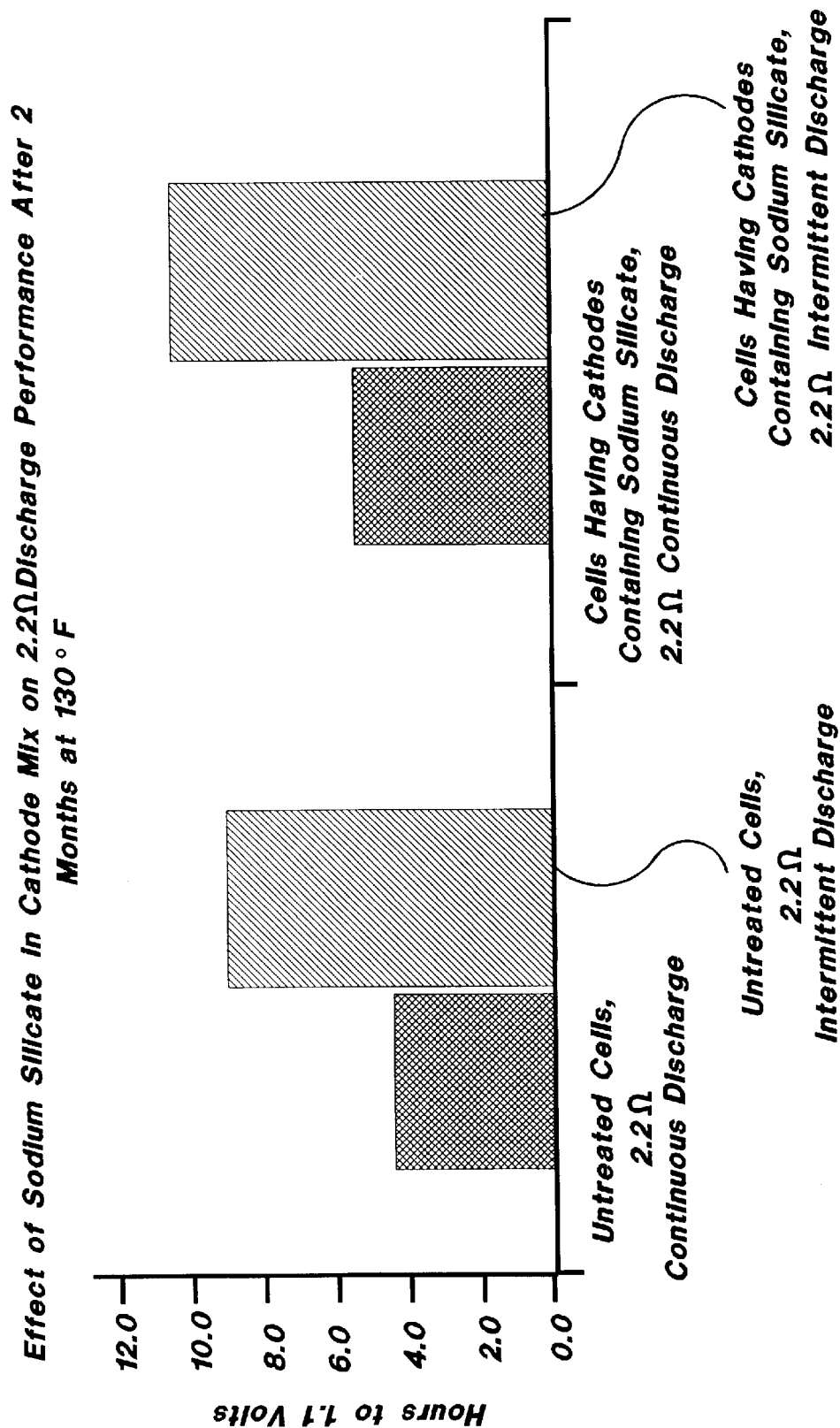

ALKALINE MANGANESE DIOXIDE ELECTROCHEMICAL CELL HAVING COATED CAN TREATED WITH SODIUM SILICATE

FIELD OF THE INVENTION

The invention relates to alkaline electrochemical cells, and, in particular to a coated can for such cells, where the can, the coating, or the can and the coating are treated with sodium silicate or silicic acid. The treatment improves the performance characteristics of alkaline manganese dioxide cells having coated cans by reducing the high resistance between the cathode and the current collector.

BACKGROUND OF THE INVENTION

Small primary electrochemical cells have been commercially available for more than a century. Originally, all small commercially available primary electrochemical cells and batteries were of the zinc carbon type. However, the need for a higher capacity primary battery system led to the development of alkaline batteries. These batteries typically use an alkaline electrolyte instead of ammonium chloride and zinc chloride dissolved in water. Within the last two decades alkaline electrochemical cells have become a tremendous commercial success. In fact, sales of alkaline batteries now exceed those of zinc carbon batteries in the United States.

The most commercially successful alkaline batteries have been cylindrical cells of the well known "AAA", "AA", "C" and "D" sizes. Generally, such alkaline cylindrical batteries comprise a cathode which is a mixture of manganese dioxide, $MnO_2$, and a carbonaceous material, typically graphite. In some cylindrical alkaline cells, this cathode mixture, which is often wetted with electrolyte is compressed into annular rings. The cathode is placed into a metallic container which also serves as the positive current collector. Anodes of alkaline electrochemical cells usually comprise powdered zinc in some type of gel, usually carboxymethylcellulose. The anodic current collector, usually a brass pin, is placed in electrical contact with the anode. The anode and the cathode of such alkaline cells are usually separated by a separator comprised of non-woven, inert fabric.

As with other electrochemical cell systems, a decrease in the internal cell resistance of alkaline electrochemical cells increases cell performance. It is generally agreed that much of the internal resistance in alkaline electrochemical cells results from poor electrical contact, i.e., contact resistance, between the cathode and the positive current collector and the electrical resistance of the positive current collector. Consequently, it is desirous to provide for an alkaline electrochemical cell which has a positive current collector with low electrical resistance and good electrical connection between the positive current collector and the cathode.

One method of obtaining the desired electrical contact between the positive current collector and the cathode mix is to create high pressure at the interface between the two members. Hosfield, in U.S. Pat. No. 3,156,749, obtains high pressure contact through forming a cylindrical battery cathode by impact molding it within the current collector. High pressure contact can also be achieved by inserting annular rings of cathode mix into the positive current collector, which has an inside diameter less than the outside diameter of the cathode rings.

Even with good electrical connection realized through high pressure contact, it has been long recognized that contact resistance between the cathode and an untreated steel current collector causes a reduction in the performance of alkaline dry cell batteries. This resistance, which is known to increase during storage especially at high temperatures, is believed to be a function of the amount of oxide formed at the cathode-current collector interface. It is believed that the alkaline electrolyte reacts with the surface of the current collector to form a solid oxide.

A number of solutions to this increased resistance, e.g. oxide formation, have been suggested. For example, Ruben, in U.S. Pat. No. 3,066,179, taught that by applying a thin coat of gold to a steel current collector, the resistance between the cathode mix and the current collector would be markedly decreased since oxide formation would be minimized. In U.S. Pat. No. 3,485,675, Ruben suggested a surface carburized layer on the steel. Again, the solution taught by Ruben decreased the amount of oxide formed at the cathode-current collector interface. Moreover, both solutions taught by Ruben supplied the surface of the current collector with a continuous layer of a material which approximated the conductivity of bare metal. However, with the price of gold at least ten times greater today than when Ruben proposed its use as a coating for the current collector and the well-known expense and difficulty of obtaining a carburized surface layer on steel, other ways of reducing contact resistance in alkaline electrochemical cells are needed.

To avoid the expensive solutions for reducing the contact resistance between the cathode mix and the positive current collector proposed by Ruben, in Japanese Patent Publication No. 42-25145 Uchida et al. proposed coating the entire inner surface of the positive current collector with a graphite laden synthetic resin. However, since it is well known that placing any material which is less electrically conductive than steel between the cathode mix and the positive current collector increases the electrical resistance of the current collector (and graphite is at least one order of magnitude less conductive than steel and most synthetic resins are orders of magnitude less conductive than steel), the '145 reference proposes using substantial amounts of graphite in the resin. In a similar teaching, Shinoda et al. disclose in Japanese Patent Publication No. 48361-1983 a resinous coating having a high amount of carbonaceous material, wherein the coating contains between 50 and 70 weight percent carbon, and the coating is disposed over the entire inner surface of the positive current collector.

The amounts of carbon proposed for use in the synthetic resins by the Japanese references are so high that it is very unlikely that the resinous coatings disclosed therein would adhere to a positive current collector well enough for further processing. Moreover, even if the coatings did adhere to a metal current collector, they would probably lack sufficient mechanical integrity to remain attached thereto. For example, a small mechanical shock, such as placing a battery in a device, might cause the coating to become dislodged from the metal current collector. Moreover, both references disclose coatings disposed continuously over the entire inner surface of the positive current collector, thereby making the manufacture of cells according to those inventions a slow and expensive process. Consequently, the problems inherent with such large amounts of carbon in a dry coating, together with the requirement that the coating be continuous, cause the search for a more complete solution to the problem to continue.

While all of the aforementioned solutions have been attempted, the present commercial solution involves plating a steel current collector with nickel. While less expensive than plating a surface with gold or providing such a surface with a carburized layer, nickel plating has been found to be an expensive solution to the problem of decreasing contact resistance, without increasing internal cell resistance. Nickel plating of steel has been thought to be of such importance that some battery manufacturers have used resinous coatings such as were disclosed in the aforementioned Japanese references on nickel plated steel current collectors. (It is interesting to note that the aforementioned Japanese references do not propose using the various resins on unplated steel current collectors.) Consequently, the ability to use a steel current collector without providing for an expensive to apply continuous surface layer has long been sought by the manufacturers of alkaline electrochemical cells.

SUMMARY OF THE INVENTION

The invention is an alkaline electrochemical cell having a positive current collector comprising an unplated steel can coated with a conductive polymeric coating, where the coating or the inner surface of the can, or both the coating and the inner surface of the can, have been treated with sodium silicate or silicic acid. The cathode of a cell of the present invention may additionally contain sodium silicate. The combination of the coating and the action of sodium silicate or silicic acid on the inner surfaces of the can or coating reduces the internal resistance of the cell. A polymeric resin, which upon drying becomes a thin conductive coating, in combination with the sodium silicate or silicic acid treatment of the can or the coating, apparently prevents the formation of a high resistance layer between the cathode and the positive current collector, even during storage at elevated temperatures.

There are two basic features and embodiments of the invention. In a first embodiment and feature of the invention, an aqueous solution of sodium silicate treats the inner surface of a coated or uncoated can. In a second embodiment and feature of the invention, silicic acid is added to the coating when in its liquid form, and the treated coating is spayed on the inner surface of the can. The two embodiments of the invention may be combined with one another in the same cell. In any embodiment of the invention, sodium silicate may be added to the cathode of the cell.

The electrochemical cell and method of treating an electrochemical cell of the invention have certain objects. That is, the invention provides solutions to problems existing in the prior art. For example, the invention provides an electrochemical cell and method of making same that: (a) provides improved performance on intermittent and continuous discharge; (b) provides longer life and greater capacity, and (c) reduces corrosion of the inner surface of the can.

The invention provides certain advantages, including lower manufacturing costs relative to conventional nickel-plated cans, an environmentally safe method of treating the cans, and the ease with which it may be implemented.

BRIEF DESCRIPTION OF THE DRAWINGS

Other objects, features and advantages of the present invention will become more fully apparent from the following detailed description of the preferred embodiment, the appended claims and the accompanying drawings, where:

FIG. 17 shows intermittent and continuous discharge test results for coated can cells and cells having cathodes containing sodium silicate after two months of storage under high temperature conditions.

DETAILED DESCRIPTION OF THE PREFERRED EMBODIMENTS

In the course of adapting the "coated can" invention of U.S. Pat. No. 5,447,809 from old or formerly manufactured Rayovac 814 (C size) and 813 (D size) type primary alkaline cells to new or next generation LR20 (D size) and LR14 (C size) type primary alkaline cells, certain corrosion problems were noted. Rayovac 813 and 814 type primary alkaline cells are no longer manufactured, and have been replaced with LR20 and LR14 type cells.

The "coated can" invention is described in Examples 1 through 4 below, and results obtained therewith are shown in FIGS. 1 through 6. More details concerning the "coated can" invention are set forth in U.S. Pat. No. 5,447,809, issued 5 Sep., 1995 and entitled "Primary Alkaline battery Containing Coated Current Collector", the disclosure of which is hereby incorporated by reference in its entirety.

Figure 1:
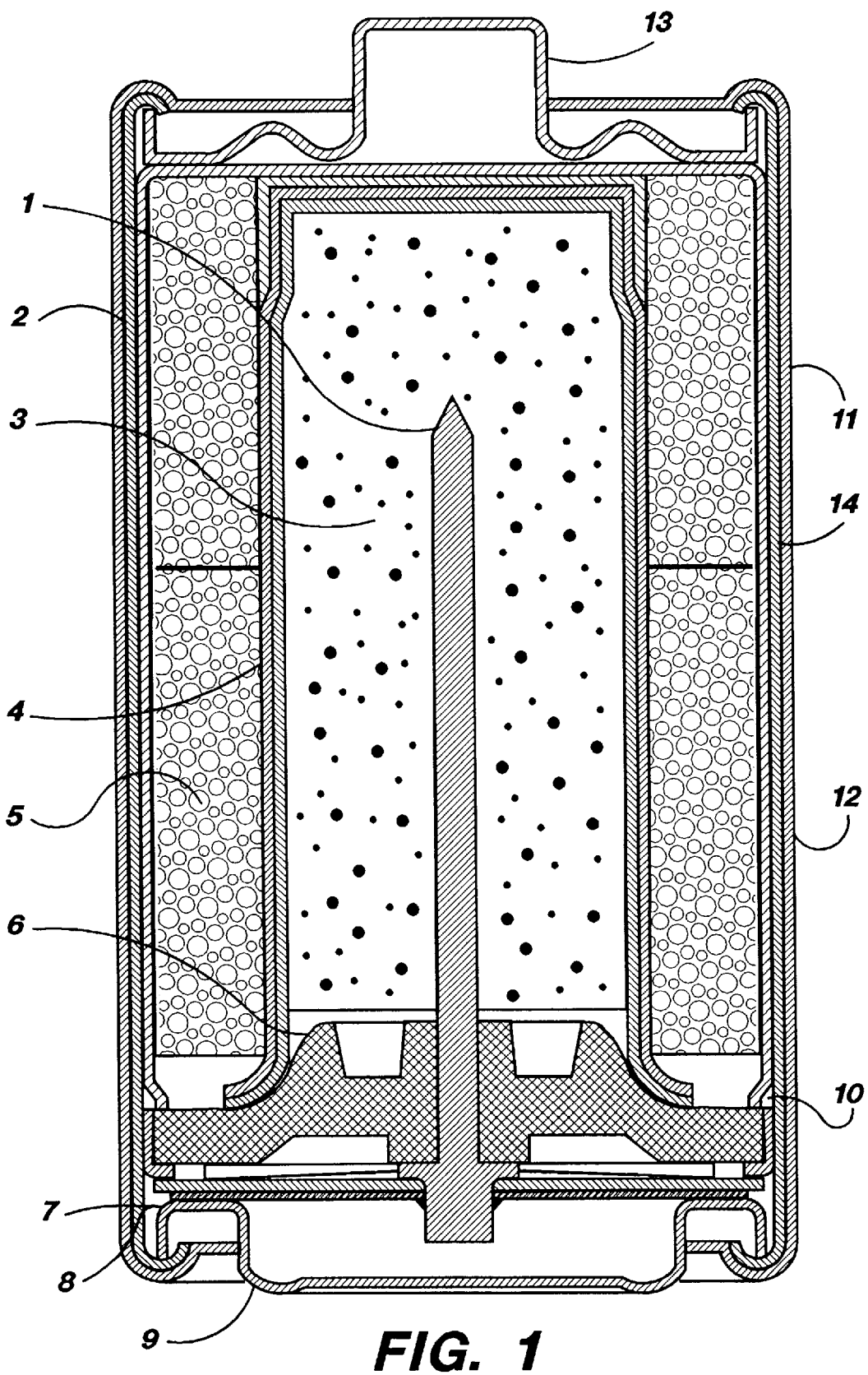
FIG. 1 is a drawing of an alkaline cylindrical battery incorporating the present invention.

FIG. 1 is a cross-sectional diagram of a Rayovac 814 or 813 primary alkaline cylindrical battery employing the coated can invention described in U.S. Pat. No. 5,447,809, and optionally including a can or coating treated in accordance with the, present invention. In FIG. 1, the positive current collector, an unplated cylindrical steel container 2, initially open on its second one end and having a closed first end or bottom, is about 0.010 inches thick, and has a coating 14 applied to its inner surfaces. Two cylindrical annular cathode rings 5, formed such that their outside diameters at their outer peripheral sidewalls are greater than the inside diameter of the positive current collector, are forced into the positive current collector, forming a pressure contact with the coating. Cathode rings 5 further have inner peripheral sidewalls forming a centrally shaped void within which anode 3 and separator 4 are disposed.

A bead 10 is rolled into the container near the open end to support the sealing disk. A separator 4 and an anode 3 are placed inside of the cathode rings. Anode 3 is generally cylindrically shaped, has an outer peripheral surface which engages the inner surfaces of separator 4, and comprises gelled zinc. Separator 4 is most preferably an ionically permeable separator, and is interposed between anode 3 and the inner peripheral sidewalls of cathode rings 5. An alkaline aqueous electrolyte comprising potassium hydroxide and water at least partially wets anode 3, cathode rings 5, and separator 4.

A sealing disk 6 having a negative current collector 1 disposed therethrough is placed into the open second end of the container and in contact with the bead. The open end of the container is crimped over the seating disk thus compressing it between the crimp and the bead to seal the cell. An insulation washer 7 with a central aperture is placed over the crimped end of the cell such that the end of the negative current collector 1 protrudes through the aperture. A contact spring 8 is affixed to the end of the negative current collector 1. Terminal caps 9 and 13 are placed into contact with the contact spring 8 and the positive current collector 2, respectively, and an insulating tube 12 and steel shell 11 are placed around the cell and crimped on their ends to hold the terminal caps in place.

In a preferred embodiment of the invention, steel shell 11 and insulating tube 12 are eliminated from the cell, and a multilayer adhesive label is placed directly about container 2. This preferred embodiment of the invention permits steel container 2 to have a greater diameter, and thus increases the amount of interior volume available to house electrochemically active anode and cathode material. As a result, the preferred embodiment of the invention provides an electrochemical cell having greater electrical charge capacity. Rayovac primary alkaline cells having no steel shell 11 or insulating tube 12 are known as LR20 and LR14 type cells.

The coating disposed on the inner surfaces of container 2 is a conductive polymeric coating comprising a first film forming binder component and a second component comprising at least one of an electrically conductive carbon and an electrically conductive filler. The film forming component is resistant to chemical reaction with the alkaline electrolyte, and is interposed between and in electrical contact with the outer peripheral sidewalls of the cathode and the inner surface of the container.

813 and 814 type cells employed a cathode can formed from unplated steel and having the coating described in U.S. Pat. No. 5,447,809. The completed cell was enclosed in the steel shell 11 and insulating tube 12 shown in FIG. 1. Steel shell 11 and tube 12 helped protect container 2 from the environment, and thereby inhibited corrosion of the exterior surface of container 2. Cathode rings 5 had initial diameters larger than the diameter of container 2 prior to being placed inside container 2. Cathode rings 5 were forced into container 2, where they expanded outwardly to engage in intimate contact the inner surface of container 2.

New LR20 and LR14 type cells have container cans 2 of larger diameter than those employed in 814 and 813 type cells. Cathode rings 5 for LR20 and LR14 type cells are prepared with initial diameters smaller than that of container 2. In LR20 and LR14 type cells, cathode rings 5 are loosely placed inside container 2, and then forced to conform to the inner diameter of container 2 through a combination of a downward force being applied to the top surface of topmost ring 5, and a rod of fixed outer diameter being disposed the central aperture of rings 5 while the downward force is being applied. It was discovered that the process of inserting and forming cathode rings 5 in containers 2 of LR20 and LR14 type cells causes container 2 to stretch and expand somewhat.

Experimental Rayovac LR20 and LR14 type primary alkaline electrochemical cells of the well known D and C sizes, respectively, and having the coating described in U.S. Pat. No. 5,447,809, were tested. The treatment of the present invention was not applied to the can, coating or cathode of those cells. Completed cells were placed in storage for one month at an elevated temperature of 130° F., after which time they were removed from storage, disassembled and examined. It was discovered that the inner surfaces of the cans were corroded, and that the coatings applied to the inner surfaces of the cans were peeling off.

The foregoing test results indicated that accelerated corrosion occurred in new LR20 and LR20 type cells respecting old 813 and 814 cells. It is suspected that the aggressive cathode ring consolidation and formation process used in LR20 and LR14 type cells may cause small cracks to form in the coating disposed on the inner surfaces of container 2. Those cracks, in turn, may permit electrolyte access to more fresh, uncoated, unplated steel surfaces than would otherwise be possible. As a result, corrosion may be accelerated, and the internal resistance of the cell increases as the degree of corrosion of the inner surface of container 2 increases.

The following U.S. patents, all entitled "Multilayer Adhesive Label" and hereby incorporated by reference in their respective entireties, describe multilayer adhesive labels finding particular advantageous application in the present invention: U.S. Pat. Nos. 4,801,514; 4,911,994; 5,032,477; 5,262,251; 5,312,712; 5,326,654; and 5,358,804. It has been discovered that some of the foregoing multilayer adhesive labels have adhesives that inhibit the corrosion of the exterior surface of the unplated steel container. More particularly, it was discovered that the exterior surfaces of unplated steel containers 2 did not rust appreciably when exposed to high temperature (113° F.), high humidity (90% relative humidity) storage conditions for more than a year when multilayer adhesive layers had been applied thereto.

Several examples of the utility of the present invention will now be explained. FIGS. 1 through 6, Examples 1 through 4, and the text corresponding to FIGS. 1–6 and Examples 1–5 relate to the aforementioned "coated can" invention and patent. FIGS. 7 through 17, Examples 5 through 8, and the text corresponding to those figures and examples relate more particularly to the present invention.

EXAMPLE 1

Five grams of XC-72 carbon black (Cabot Corporation) and 500 grams of Adcoat 52G1B (Morton Chemical Co.), which is approximately 2% solids, were added to a jar which was one-half full of one-eighth inch steel shot. The jar was capped and placed on a ball mill for 45 minutes. The contents of the jar were then sprayed onto the interior surface of unplated steel, D-size alkaline manganese positive current collectors and dried at 180° F. for five minutes, which yielded a carbon concentration in the dried film of approximately 33.3%.

The cathode mix (manganese dioxide, graphite, potassium hydroxide, water, acetylene black and cement) was formed into cylinders and placed in the coated positive current collector. A separator material was placed against the inner surface of the cathode cylinders. The separator was then filled with gelled potassium hydroxide and amalgamated zinc. After a plastic seal and a negative current collector were inserted into the positive can, the battery was sealed.

Figure 2:
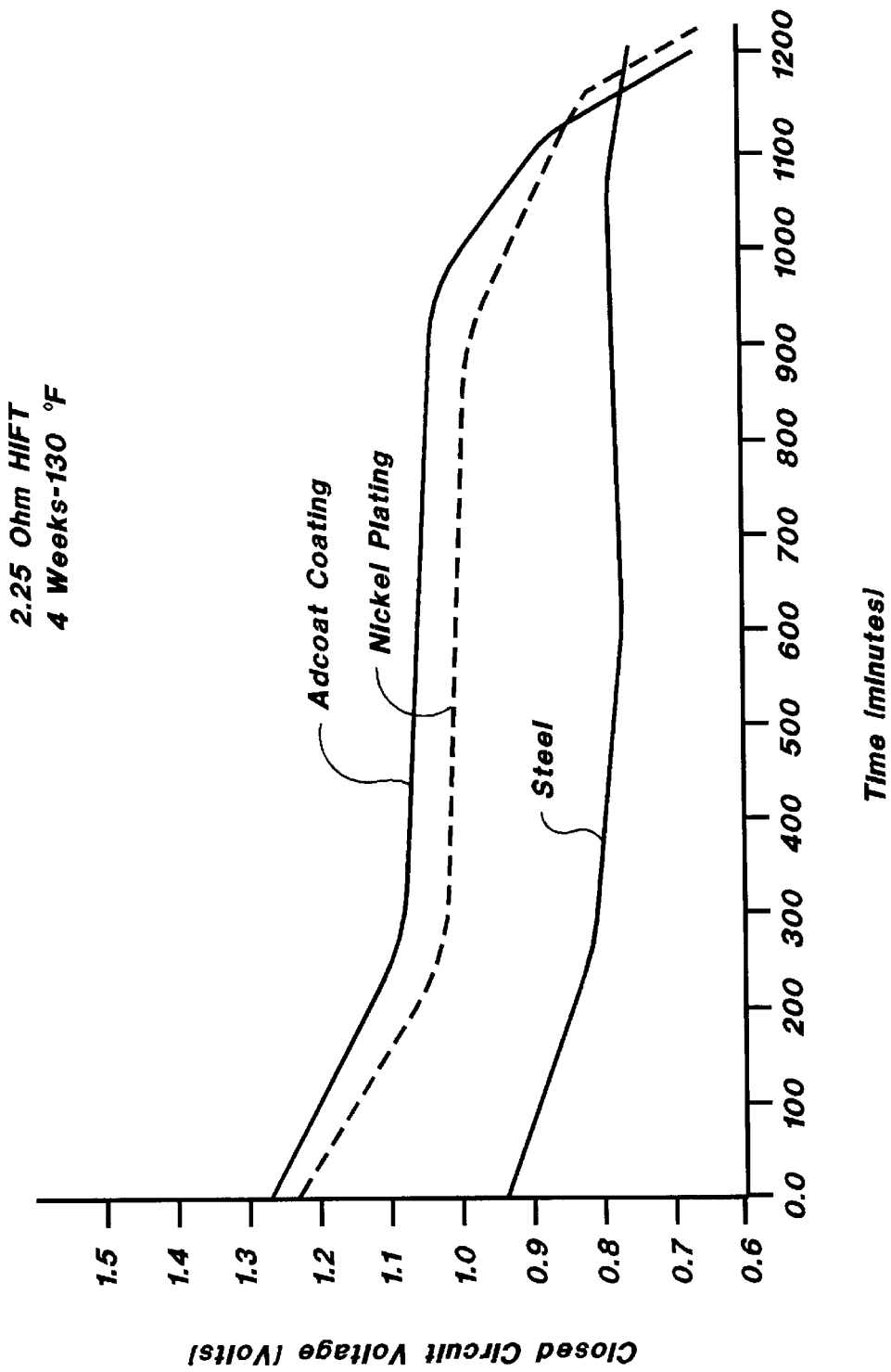
FIG. 2 is a graph of battery voltage versus discharge time for various types of batteries, including batteries having a coated can.

These batteries were discharged on the ASTM heavy industrial flashlight test (2.25 HIFT), which is 2.25 ohms four minutes out of fifteen minutes, eight hours/day, seven days/week. FIG. 2 is a graph of the 2.25 HIFT discharge voltage after storage at 130° F. for four weeks. The batteries constructed with the conductive polymeric coating covering the positive current collectors had a higher closed circuit voltage than batteries using nickel plated steel or unplated steel positive current collectors.

EXAMPLE 2

Many commercially available conductive coatings are available which are applicable to the "coated can" invention. Several examples of these conductive coatings are listed in Table 1, which describes the composition and the transverse resistance for these commercial coatings. For comparison purposes, Table 1 includes an uncoated nickel plated steel can, which has a transverse resistance of 0.00 ohms.

Figure 3:
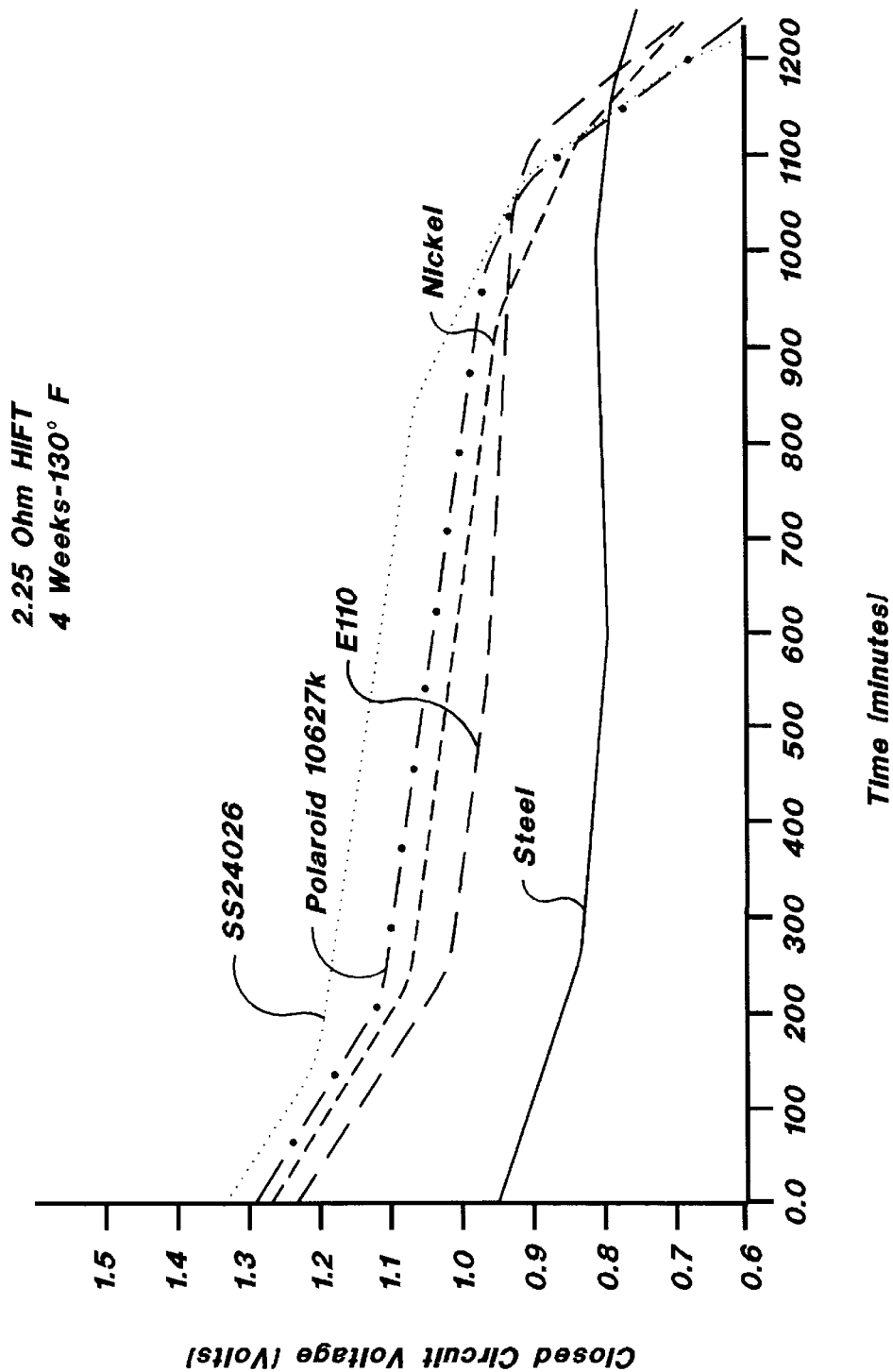
FIG. 3 is a graph of battery voltage versus discharge time for several alternative embodiments of the coated can invention.

Batteries constructed with positive current collectors coated with some of the above listed coatings perform similarly to batteries constructed with the coating in Example 1. FIG. 3, a graph of closed circuit voltage versus discharge time, after storage for 4 weeks at 130° F., on the 2.25 HIFT test, compares the performance of batteries constructed with positive current collectors coated with commercially available conductive coatings with batteries constructed as in Example 1.

TABLE 1

Commercial Conductive Polymer Compositions

| Conductive Polymer | Conductive Agent | Polymer Type | Manufacturer | Transverse Electrical Resistance on "D" Size Steel Cans (Ohms/ 1.275 in²) |
|---|---|---|---|---|
| 10627-K | Carbon Black | PVC | Polaroid | .037 |
| SS24055 | Graphite | epoxy | Acheson Colloids | .271 |
| SS24056 | Graphite | epoxy | Acheson Colloids | .094 |
| SS24026 | Graphite | epoxy | Acheson Colloids | .177 |
| SS24018 | Graphite | vinyl | Acheson Colloids | .116 |
| Electrodag 110 | Graphite | PVC | Acheson Colloids | — |
| Electrodag 199 | Carbon Black | Neoprene | Acheson Colloids | — |

TABLE 1-continued

Commercial Conductive Polymer Compositions

| Conductive Polymer | Conductive Agent | Polymer Type | Manufacturer | Transverse Electrical Resistance on "D" Size Steel Cans (Ohms/ 1.275 in²) |
|---|---|---|---|---|
| Electrodag 502 | Graphite/ Carbon Black | Fluoro- elastomer | Acheson Colloids | .022 |
| LS1181 | Graphite | — | Graphite Products | .454 |
| P70 | Carbon Black | PVC | Pervel Industries | .014 |
| 155-293 | — | epoxy | G. Bartels | .006 |
| None | None | None | Nickel plated steel can | .000 |
| SS24018 | Graphite | Vinyl | Acheson Colloids | 0.022 |

EXAMPLE 3

Figure 4:
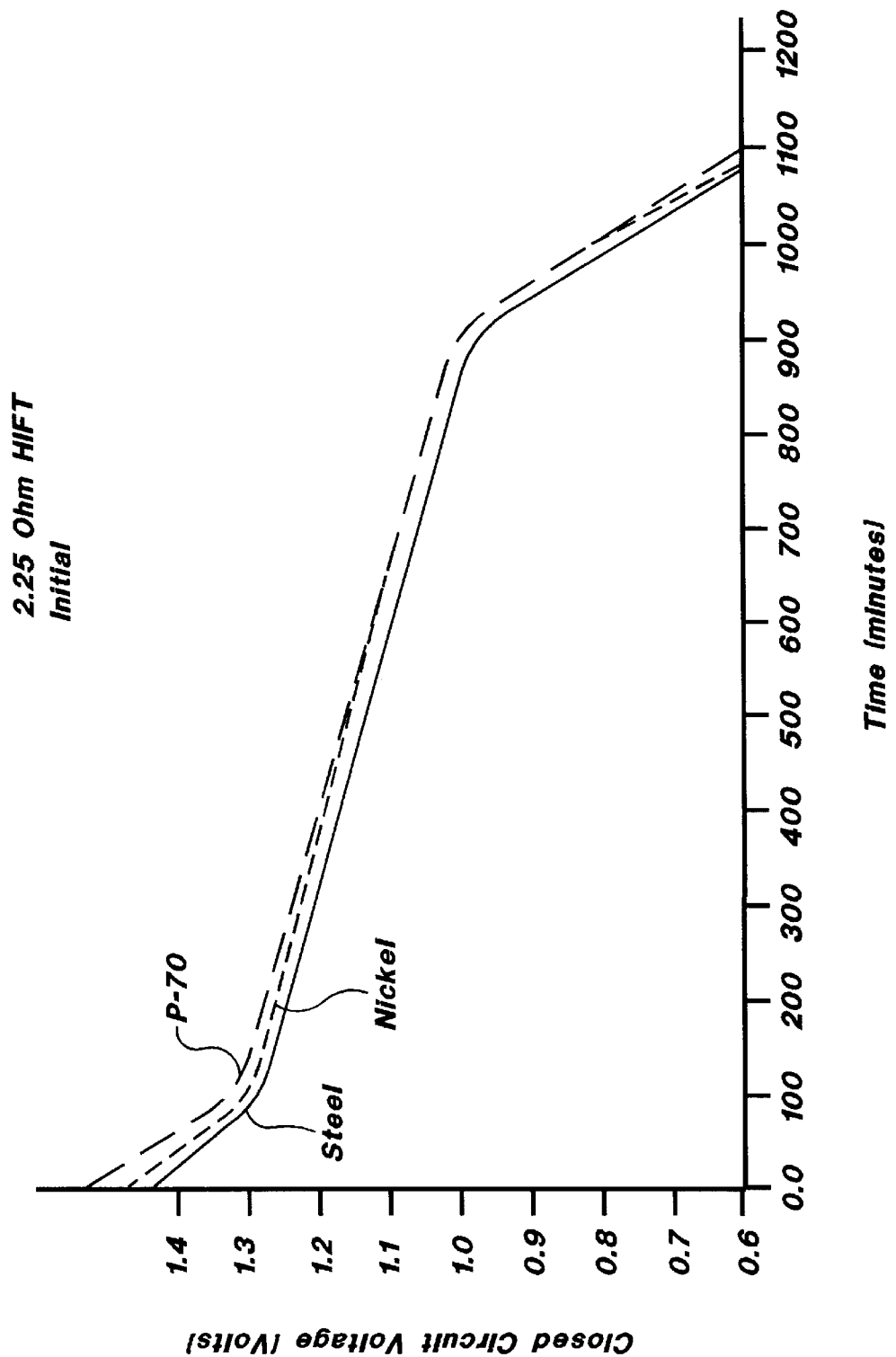
FIG. 4 is a graph of fresh battery voltage versus discharge time for various batteries, including those incorporating the coated can invention.

To demonstrate the advantage of the "coated can" invention in batteries which are stored for extended periods of time, steel cans were spray coated with P-70 primer and assembled into batteries as in Example 1. When those batteries were placed on the 2.25 HIFT, initially only a small improvement was seen in the closed circuit voltage during discharge (FIG. 4). However, when these batteries were aged at room temperature for one year, the same increase in the discharge closed circuit voltage was seen as for batteries aged for 4 weeks at 130° F. (FIG. 5), demonstrating that when batteries are constructed in accordance with the "coated can" invention, the shelf life of such alkaline batteries will be markedly increased.

EXAMPLE 4

To determine whether a continuous conductive coating of the positive current collector was required, the interior surfaces of unplated steel positive current collectors were coated with varying amounts of P-70 primer. These positive current collectors were then assembled into batteries as in Example 1. The batteries were stored for one year at 70° F. and then discharged on the 2.25 HIFT test. The results, shown in FIG. 6, evidence that it is not necessary to form a continuous, electrolyte resistant, conductive coating of the positive current collector in order to practice the "coated can" invention. Batteries made from unplated steel positive current collectors wherein the conductive film coated only 50% of the current collector performed essentially the same as those batteries wherein the positive current collector was 100% covered. Batteries wherein the conductive film covered only 25% of the positive current collector performed as well as batteries constructed with uncoated, nickel-plated steel positive current collectors.

It is well known in the battery arts that the internal resistance of a cell is the sum of the ionic and electronic resistances of the cell. In accordance with the well known equation $V/R=I$ (Ohm's Law), it is also well known that the lower the internal resistance of a battery, the more current the battery is capable of delivering. Furthermore, and also in accordance with Ohm's Law, the higher the internal resistance of a cell, the greater the voltage drop across its internal resistance, and the lower the terminal voltage of the cell.

Figure 5:
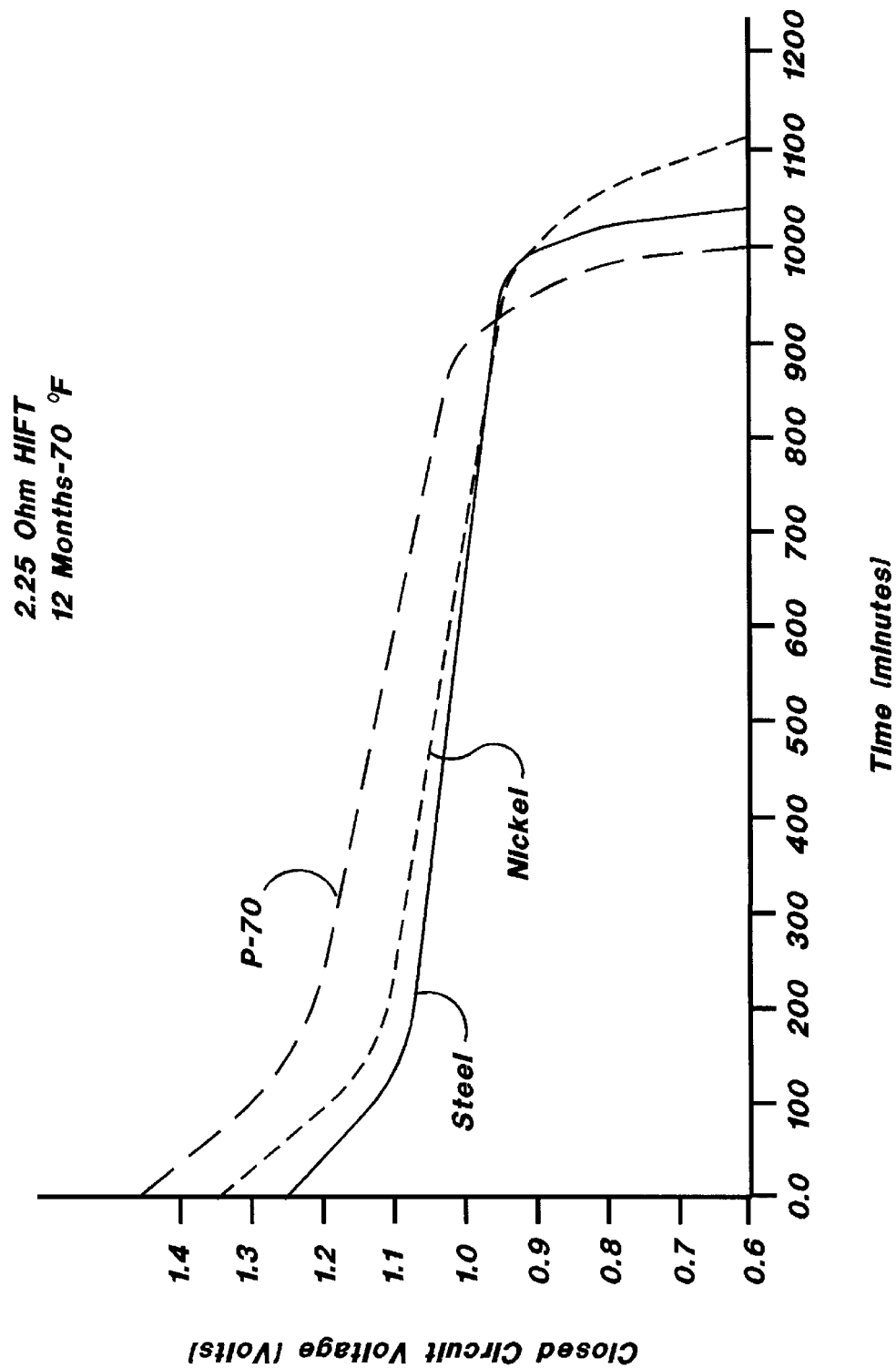
FIG. 5 is a graph of battery voltage versus discharge time after storage for twelve months for various batteries, including those incorporating the coated can invention.
Figure 6:
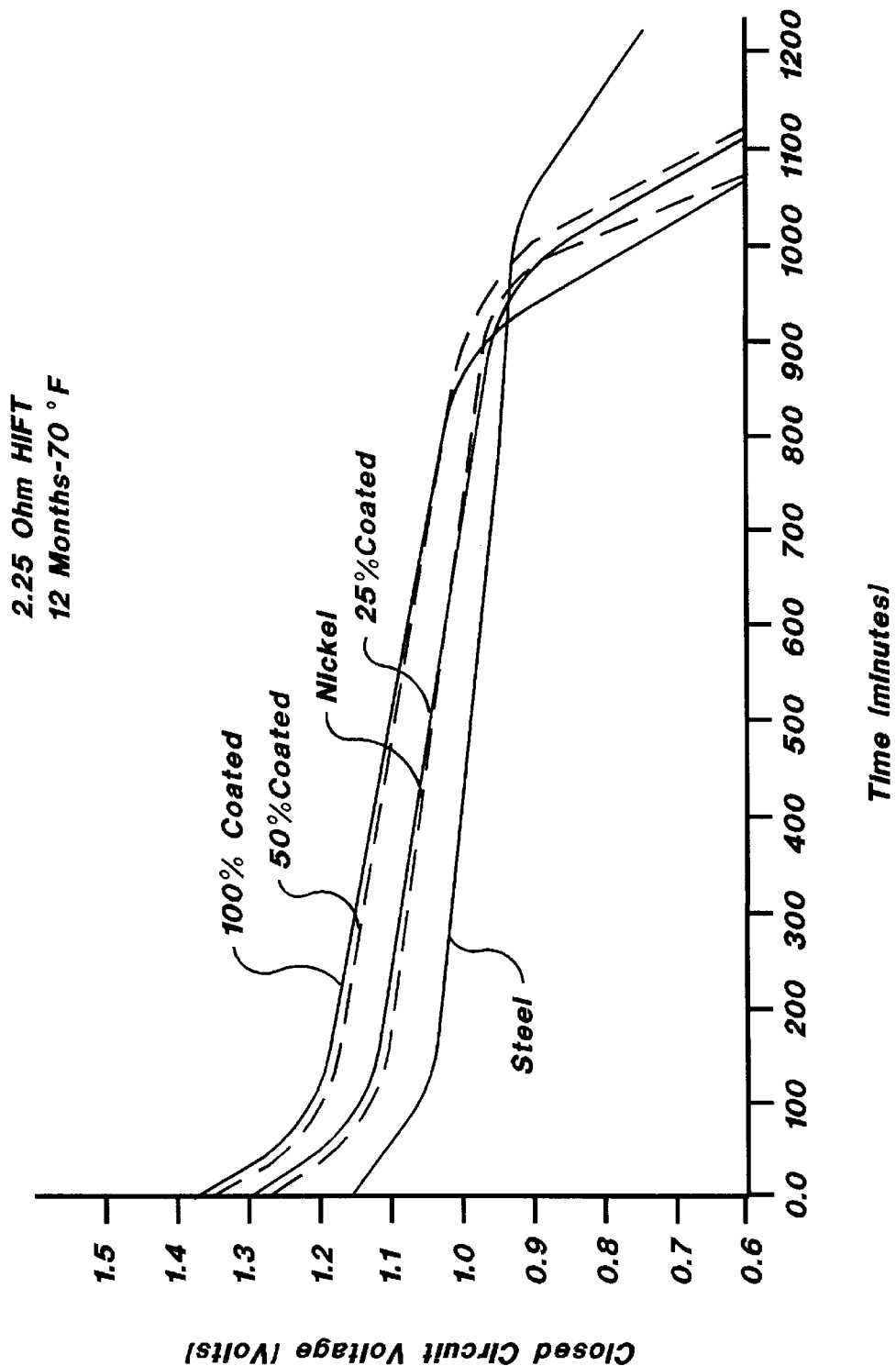
FIG. 6 is a graph of battery voltage versus discharge time after storage for twelve months for various batteries, including those incorporating the coated can invention.

FIGS. 4, 5, and 6 illustrate test results wherein all tested batteries were discharged across a constant 2.25 ohm load. Except for the conductive coating disposed on the inner surface of some cells, all tested cells were of the same construction. Thus, there was only one variable in those tests: the unplated steel containers of the tested batteries either did, or did not, have polymeric conductive coatings disposed on the inner surfaces thereof.

FIGS. 4, 5, and 6 show that cells made according to the present invention exhibit higher closed circuit voltages during discharge than do cells not having the coating disclosed herein but discharged under identical conditions. In accordance with the foregoing well known electrical principles, then, the increased performance of the cells of the "coated can" invention is directly attributable to those cells having lower internal resistances.

FIGS. 4, 5, and 6 also show that the internal resistances of cells having the coatings disclosed herein are lower in respect of cells not having the coating, even when the coating covers less than all of the internal surface of the container, and even though the coating actually increases the transverse resistance across the combined thicknesses of the coating 14 and the container 2.

The unplated steel cans of Examples 5, 6, 7 and 8 were manufactured by Central States Can of Massilon, Ohio, and were formed from tin mill 91 lb. T-2 temper 5C finish Type L black plate steel.

As used in the specification and claims hereof, the terms sodium silicate and sodium metasilicate may be used interchangeably. Moreover, the term "sodium silicate" as used in the specification and claims hereof includes, but is not limited to, a substance defined variously as (1) a gray white silica-containing powder soluble in alkalis and water and insoluble in alcohol and acids; (2) sodium metasilicate; (3) sodium metasilicate pentahydrate; (4) sodium silicate pentahydrate; (5) soluble glass; (6) water glass; (7) silicate of soda, and (8) silicic acid.

In Examples 5, 6 and 7 unplated steel cans were sprayed for about 2 seconds, with a liquid solution of coating material into the interior of each can with a spray nozzle operating at about 40 psi and the cans spinning at about 3,000 rpm. The coating material was a premixed liquid carbonaceous electrically conductive coating comprising carbon black, PVC and the solvent methyl ethyl ketone. The cans were then dried in an oven for three to five minutes at 200° F. It was discovered that the optimal weight amount of coating to apply to the cans was about 45–55 milligrams per can, where the weight amount was measured after the coating had dried. The coatings used were CARBON BLACK 50-882-082™, manufactured by RBH Dispersions, Inc. of Bound Brook, N.J., and CONDUCTIVE P70B BLACK™, manufactured by Adhereon Coatings Corporation of Oak Forest, Ill. The two coatings are substantially the same in respect of function and chemical composition.

In Example 8 unplated steel cans were coated with CARBON BLACK 50-882-082™ by spraying, for about 2 seconds, a liquid solution of coating material into the interior each can with a spray nozzle operating at 500 psi and the cans spinning at about 2,020 rpm. The cans were then dried in an oven for three and a half minutes at 200° F. It was discovered that the optimal weight amount of coating to apply to the cans was about 50 milligrams per can, where the weight amount was measured after the coating had dried.

In Examples 5, 6, and 7 cans were treated with an aqueous solution of sodium silicate, where an aqueous solution of 1% sodium silicate was poured into untreated, unplated steel cans at room temperature, and permitting the cans to stand for five minutes before removing the solution from the cans. The cans were then dried in an oven for several minutes and not rinsed before CARBON BLACK 50-882-082™ coatings were sprayed on the inner surfaces thereof. After the coatings dried, remaining cell components were placed in the treated cans to form complete, operative cells. The sodium silicate was obtained from Van, Waters, & Rogers of Milwaukee, Wis. under the designation sodium metasilicate pentahydate, where the sodium silicate comprised granular particles of 10 to 40 mesh size having a chemical formula of $Na_2SiO_3 \cdot 5H_2O$, a formula weight of about 212.74, and a specific gravity of about 2.4.

In Examples 5, 6 and 7 cans treated with fine powdered silicic acid blended into the coatings thereof were processed as follows. First, 0.5% by weight powdered silicic acid (an acid form of a sodium silicate salt) was added to a premixed carbonaceous electrically conductive coating. The coating was CONDUCTIVE P70B BLACK™, a coating that is substantially the same as CARBON BLACK 50-882-082™. The silicic acid was obtained from Fisher Chemical Company of Pittsburgh, Pa. under the designation 325 mesh A945. The coating was then sprayed on the inner surfaces of the cans. Silicic acid was used to treat the cans, as opposed to sodium silicate, because silicic acid was available in a fine, powdered form which facilitated rapid, even dispersion of the silicic acid in the paint and eased subsequent spray painting. Appropriately treated powered sodium silicate or sodium metasilicate could also have been used.

In Examples 5, 6, 7 and 8, and unless noted otherwise, the cathodes of all cells were made using a standard cathode mix formulation comprising 87% by weight electrolytic manganese dioxide, 9.7% by weight graphite, 3.3% electrolyte composed of 36.7% potassium hydroxide, 3.8% zinc oxide, and 59.5% water.

EXAMPLE 5

Figure 7:
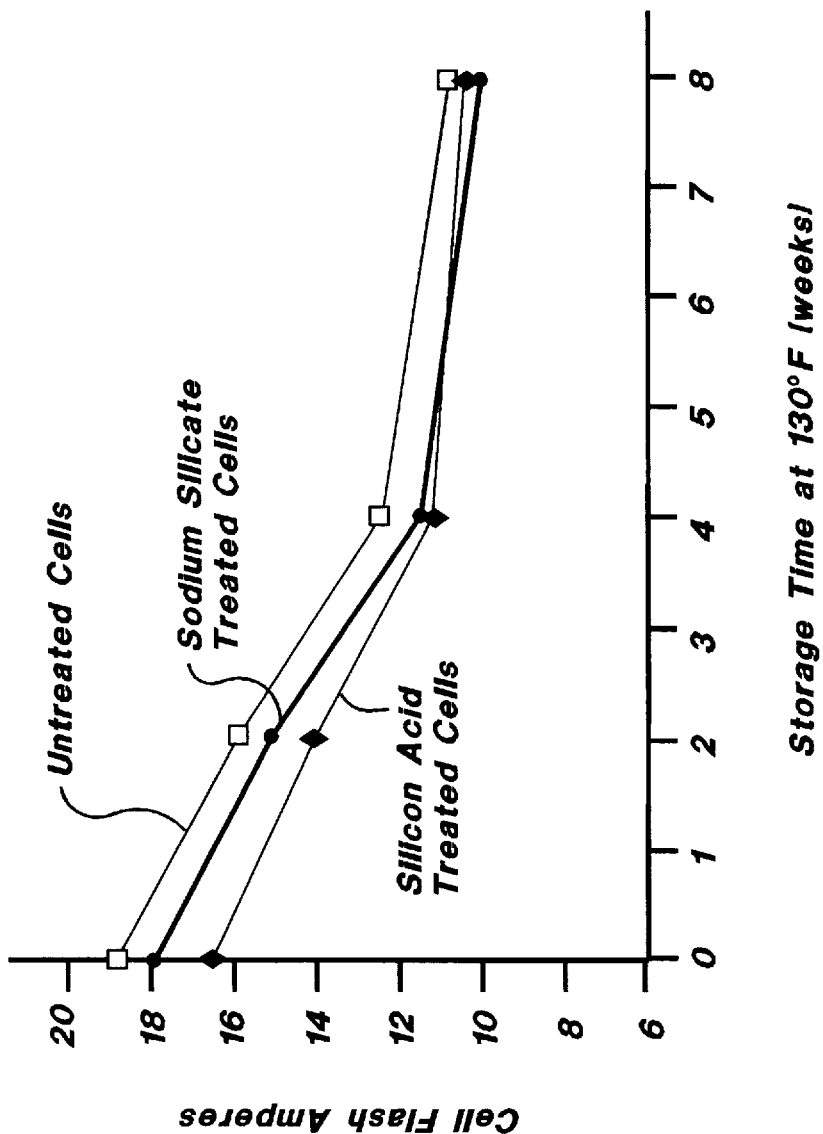
FIG. 7 is a graph of flash current versus storage time for coated can cells and cells of the present invention stored under high temperature conditions for periods of time ranging between zero and two months.
Figure 8:
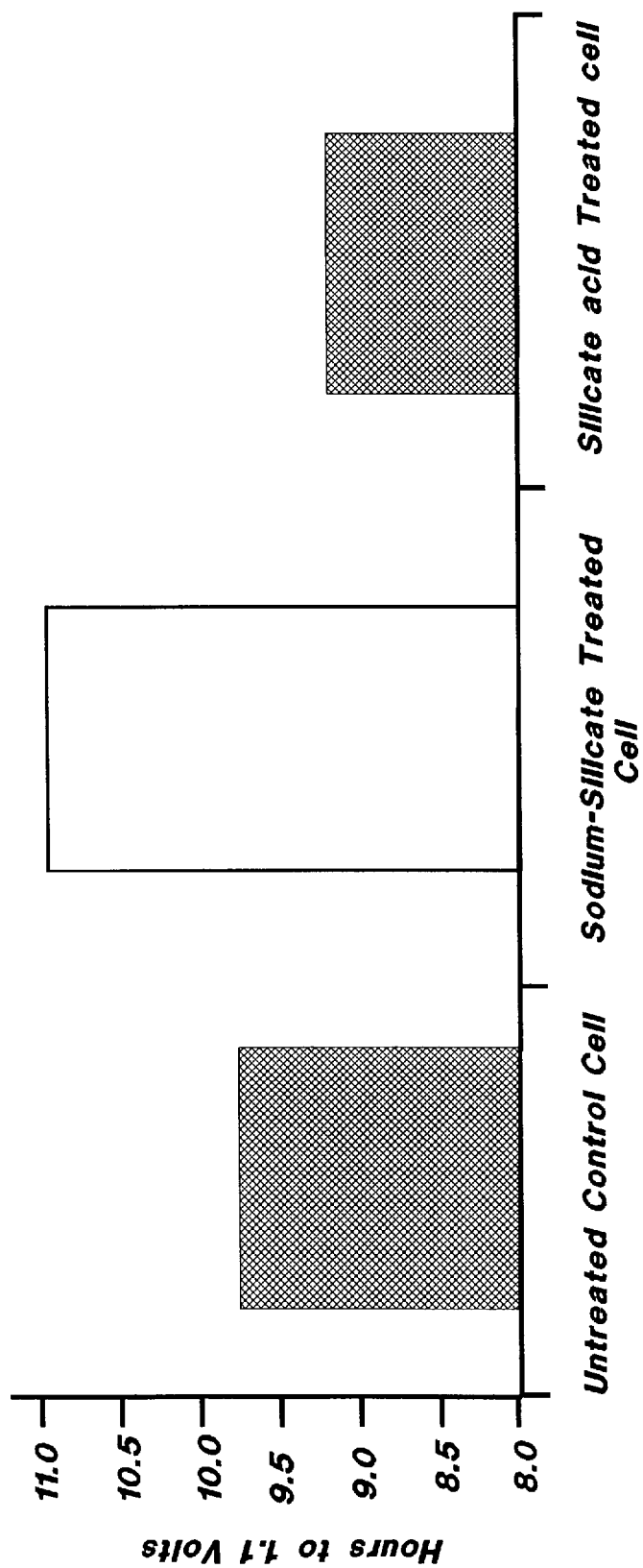
FIG. 8 shows intermittent discharge test results for coated can cells and cells of the present invention after one month of storage under high temperature conditions.
Figure 9:
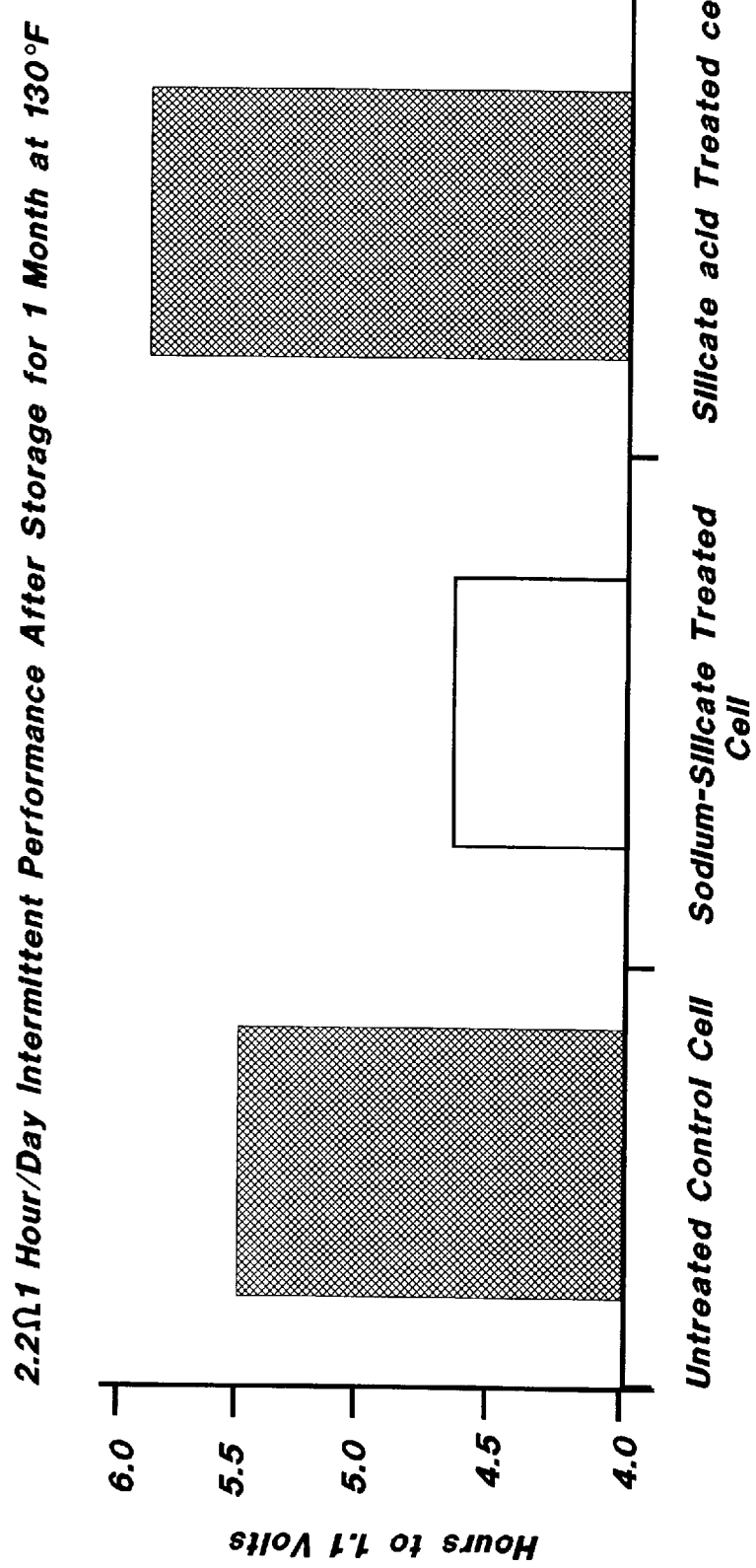
FIG. 9 shows intermittent discharge test results for coated can cells and cells of the present invention after two months of storage under high temperature conditions.

FIGS. 7, 8 and 9 show results obtained with (a) untreated control coated cans, where neither the unplated steel cans nor the coatings therein were treated with sodium silicate (hereinafter "untreated cells"), and (b) coated cans treated with (i) an aqueous solution of sodium silicate prior to the coatings being applied to the inner surfaces thereof (hereinafter "sodium silicate treated cells"), and (ii) powdered silicic acid blended into the coatings thereof before the coatings were applied to the inner surfaces thereof (hereinafter "silicic acid treated cells").

FIG. 7 shows high temperature flash current test results (hereinafter "HT flash current test") obtained with untreated cells, sodium silicate treated cells, and silicic acid treated cells. The flash current each fresh cell could deliver was first measured using an ammeter. No electrical load was placed in series with the cell and ammeter while the flash current was being measured over a 0.5 second interval. All cells were then placed in storage at high temperature (about 130° F.). Two weeks later, each cell was temporarily removed from storage, permitted to cool down to room temperature, and the flash current it could deliver was measured. Each cell was then returned to storage. At two week increments thereafter the flash current measurement process was repeated for each cell. FIG. 7 shows that cells having cans treated with sodium silicate consistently delivered more current than the control cells throughout the test period. Cells treated with silicic acid outperformed control cells after about a month of storage at high temperature.

FIGS. 8 and 9 show 2.2 Ohm modified light industrial flashlight test (hereinafter "2.2 Ohm LIF test") results obtained with untreated, sodium silicate treated, and silicic acid treated cells, after the cells had been placed in storage at high temperature (about 130° F.) for one and two months, respectively. At the end of the one or two month high temperature storage period, each cell was removed from storage, and tested at room temperature as follows. Each cell energized an electrical circuit having a 2.2 Ohm resistor load, the load simulating a typical flashlight electrical load. Each circuit had a timed switch means for completing and interrupting the circuit. Using the timed switch means, each circuit was closed, and the cell discharged across the load for one hour during each consecutive 24 hour period until the closed-circuit voltage of the cell dropped to 1.1 Volts. FIG. 8 shows that after one month of high temperature storage the sodium silicate treated cell took longer to discharge to 1.1 Volts than the control cell. FIG. 9 shows that after two months of high temperature storage the silicic acid treated cell took longer to discharge to 1.1 Volts than either the sodium silicate treated cell or the control cell.

EXAMPLE 6

Figure 10:
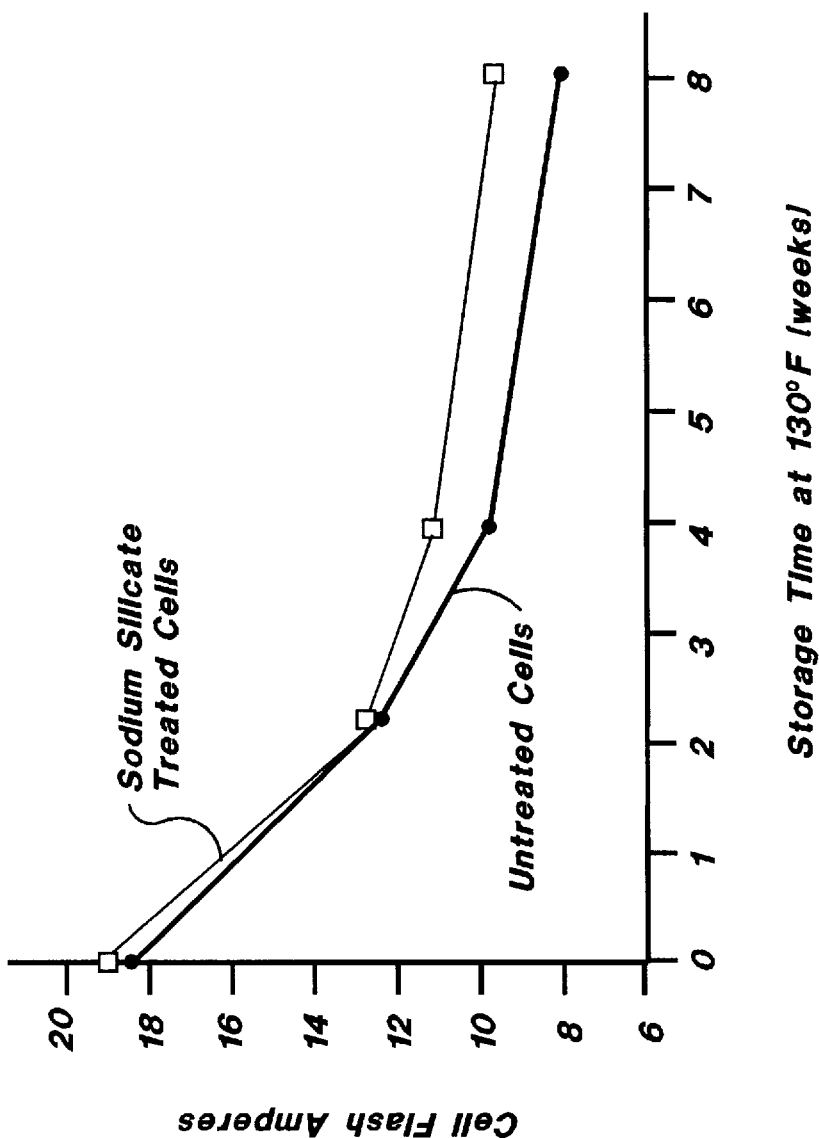
FIG. 10 is a graph of flash current versus storage time for coated can cells and cells of the present invention stored under high temperature conditions for periods of time ranging between zero and two months.
Figure 11:
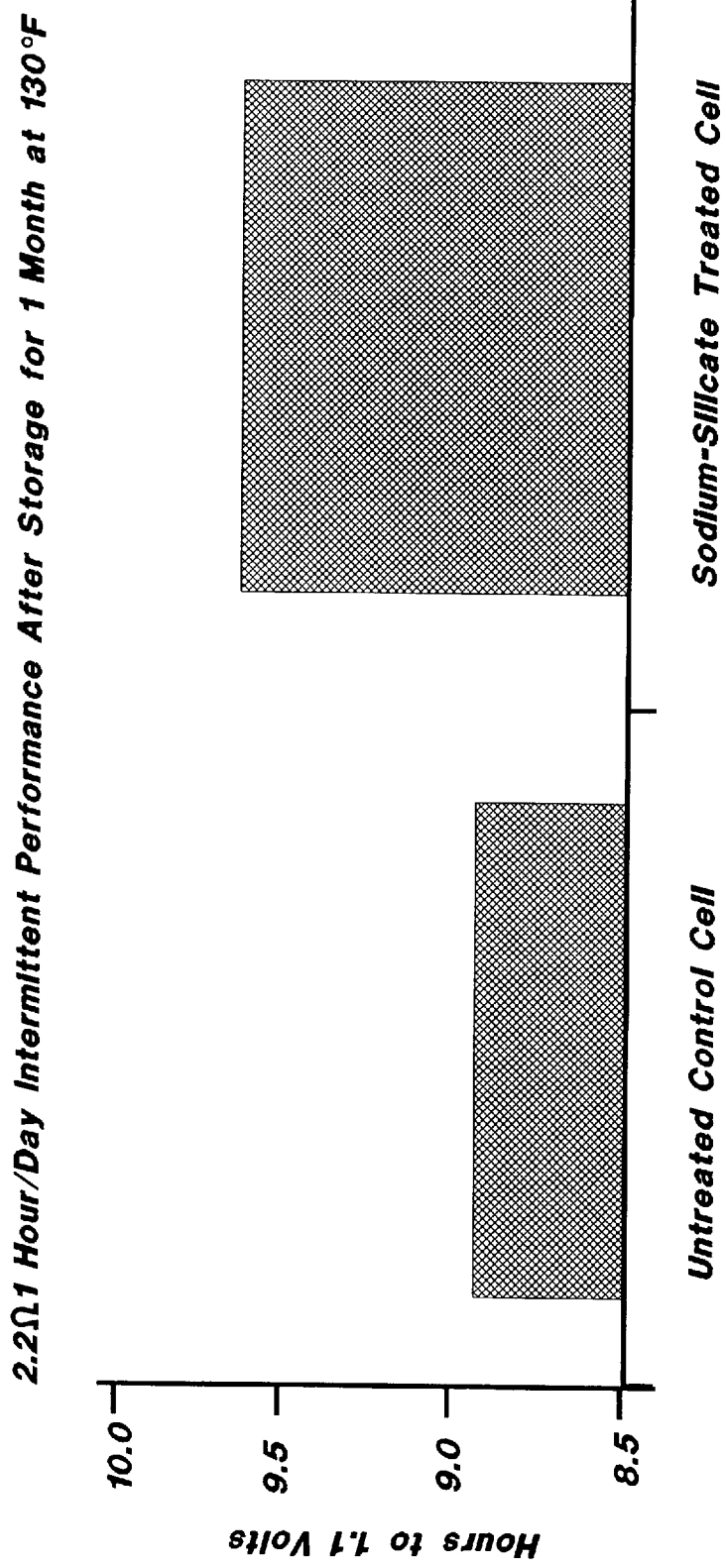
FIG. 11 shows intermittent discharge test results for coated can cells and cells of the present invention after one month of storage under high temperature conditions.
Figure 12:
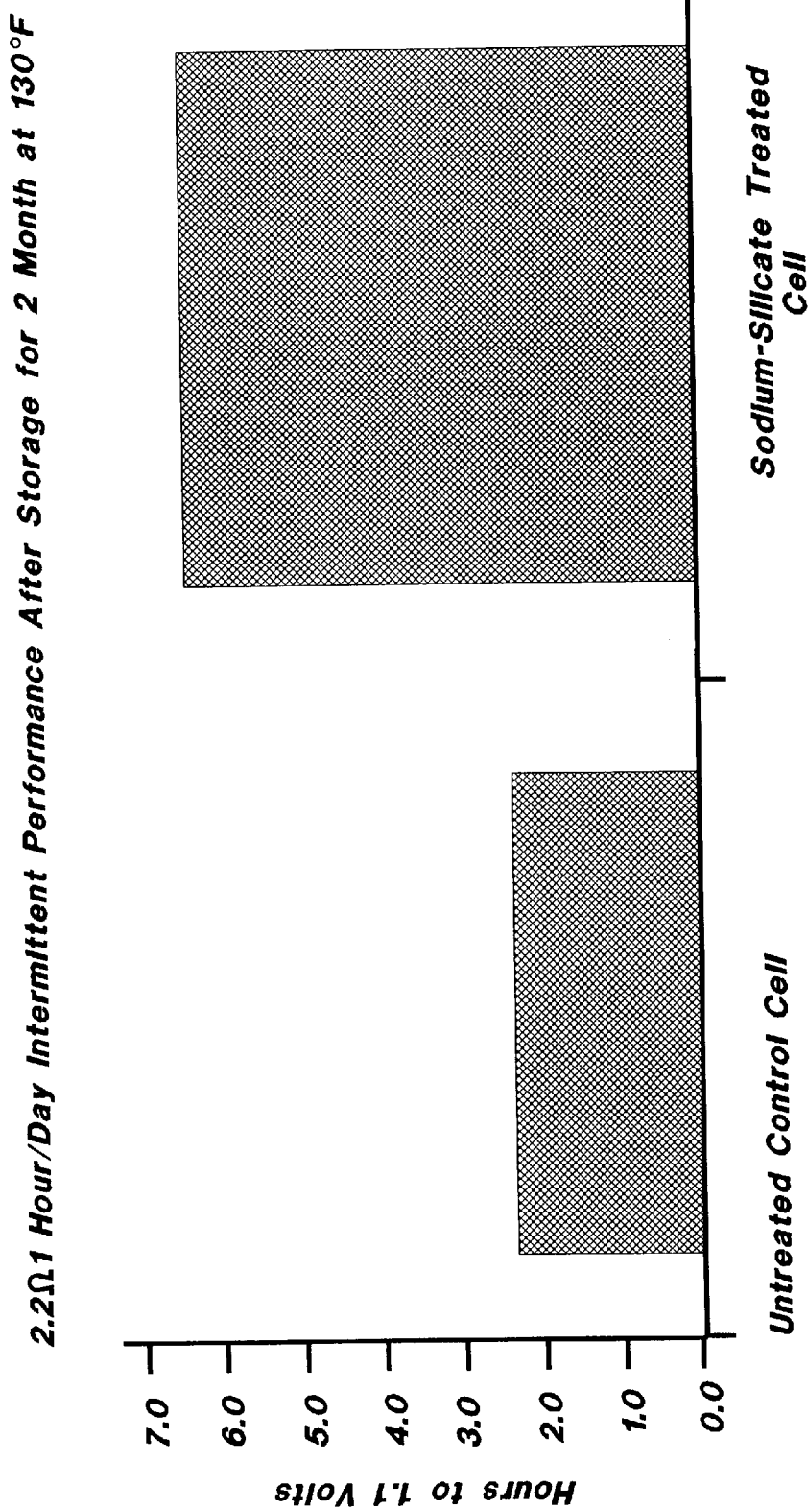
FIG. 12 shows intermittent discharge test results for coated can cells and cells of the present invention after two months of storage under high temperature conditions.

FIGS. 10, 11 and 12 show results obtained in (a) untreated cells and (b) sodium silicate treated cells.

FIG. 10 shows HT flash current test results obtained with untreated cells and sodium silicate treated cells. The same HT flash current test procedures described above in Example 5 were employed in Example 6. FIG. 10 shows that sodium silicate treated cells delivered more current than the control cells throughout the test period. The difference in performance is especially pronounced after two weeks of high temperature storage.

FIGS. 11 and 12 show 2.2 Ohm LIF test results obtained with untreated and sodium silicate treated cells, after the cells had been placed in storage at high temperature (about 130° F.) for one and two months, respectively. The same 2.2 Ohm LIF test procedures described above in Example 5 were employed in Example 6. FIGS. 11 and 12 show that sodium silicate treated cells provided superior performance in respect of the untreated control cells.

EXAMPLE 7

Figure 13:
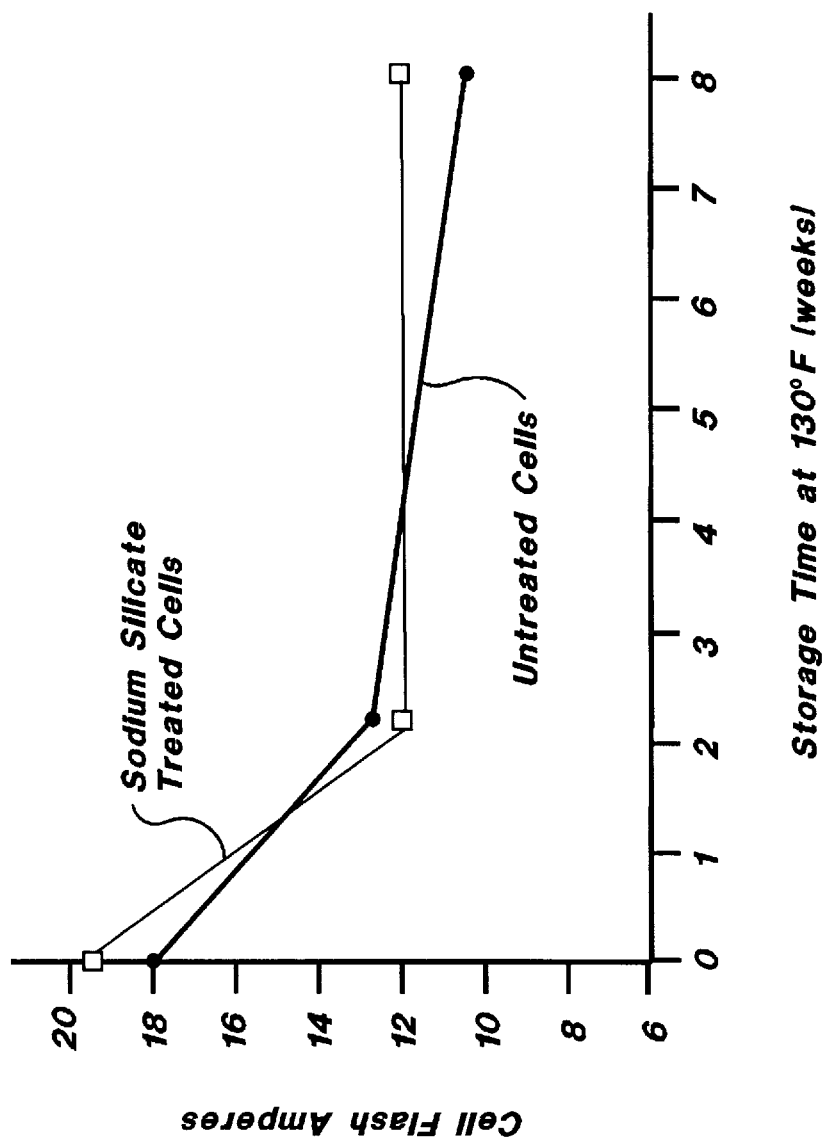
FIG. 13 is a graph of flash current versus storage time for coated can cells and cells of the present invention stored under high temperature conditions for periods of time ranging between zero and one month.
Figure 14:
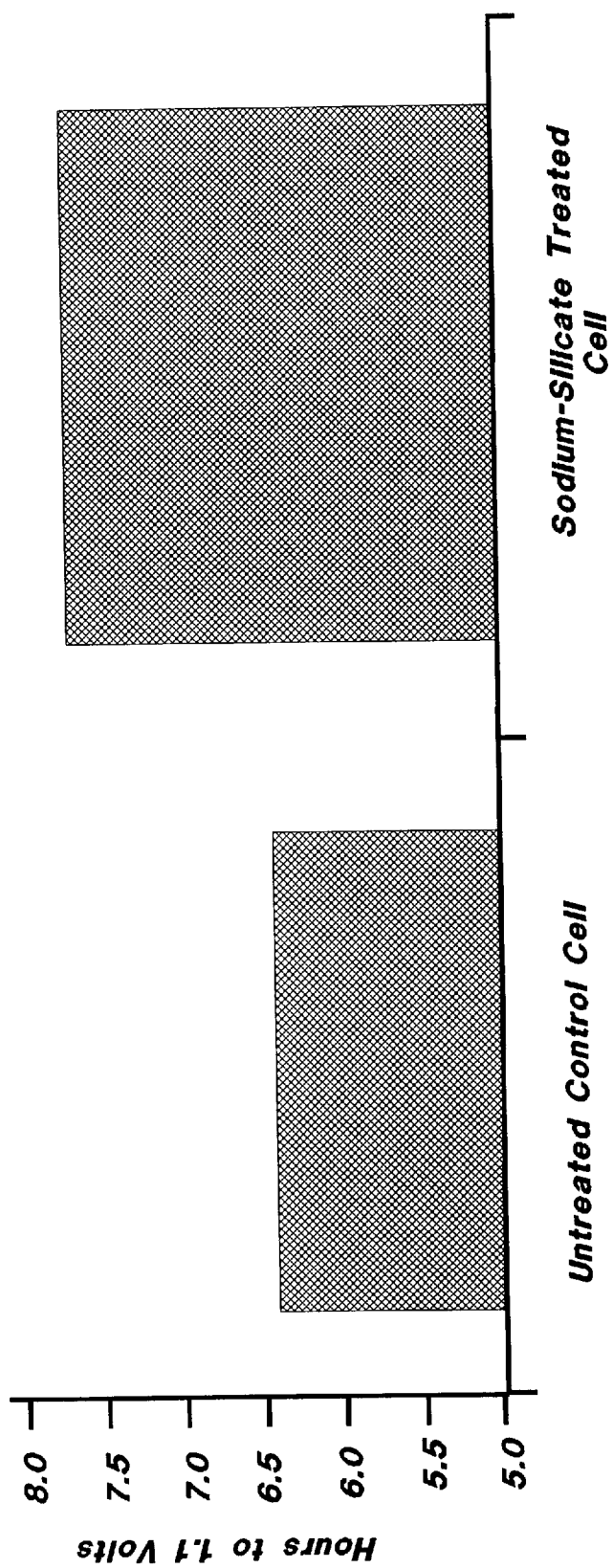
FIG. 14 shows continuous discharge test results for coated can cells and cells of the present invention after one month of storage under high temperature conditions.

FIGS. 13 and 14 show results obtained with (a) untreated cells, and (b) sodium silicate treated cells.

FIG. 13 shows HT flash current test results obtained with untreated control cells and cells treated with sodium silicate as described hereinabove in Example 7. The same HT flash current test procedures described above in Examples 5 and 6 were employed in Example 7. FIG. 13 shows that sodium silicate treated cells delivered more current than the control cells after about two weeks had passed. The difference in performance is very pronounced after four weeks of high temperature storage.

FIG. 14 shows results obtained with control cells and sodium silicate treated cells tested by continuously draining current from the cells through a 2.2 Ohm load, and measuring the amount of time for the closed circuit voltage of the tested cell to drop to 1.1 Volts. FIG. 14 shows that sodium silicate treated cells provided superior performance respecting the untreated control cells.

EXAMPLE 8

Figure 15:
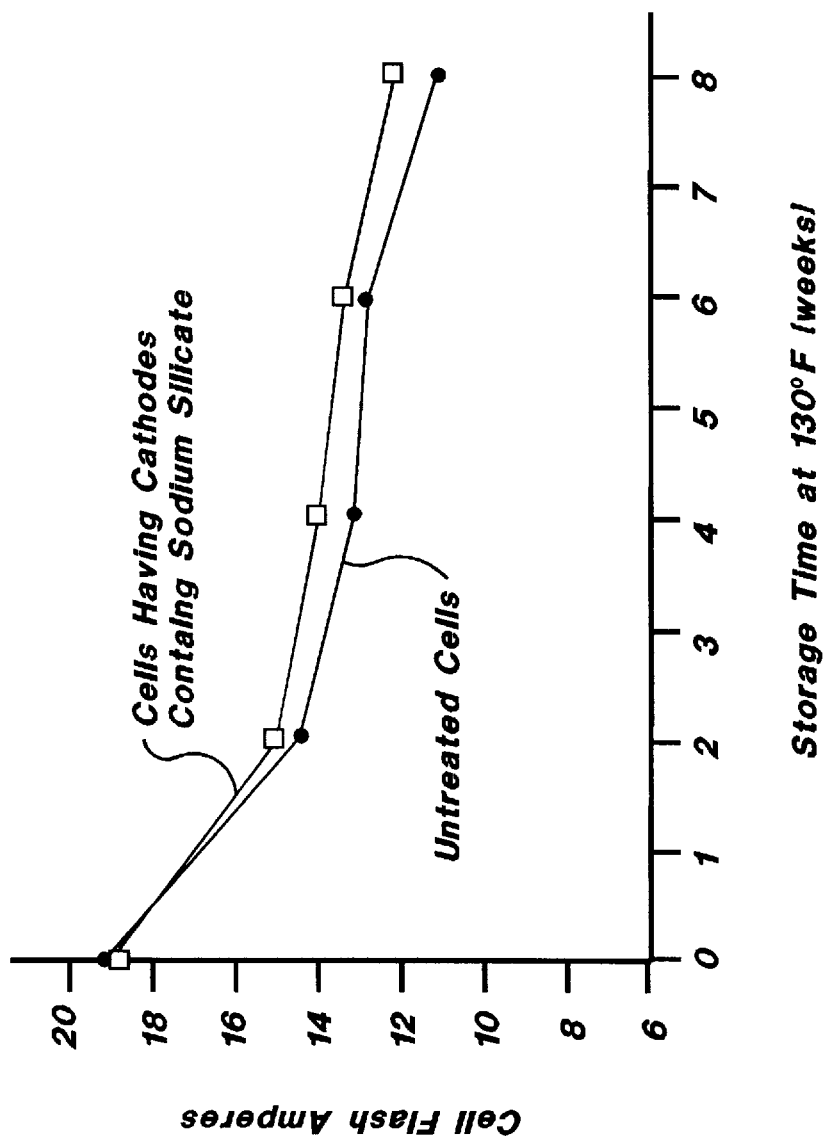
FIG. 15 is a graph of flash current versus storage time for coated can cells and cells of the present invention stored under high temperature conditions for periods of time ranging between zero and two months.
Figure 16:
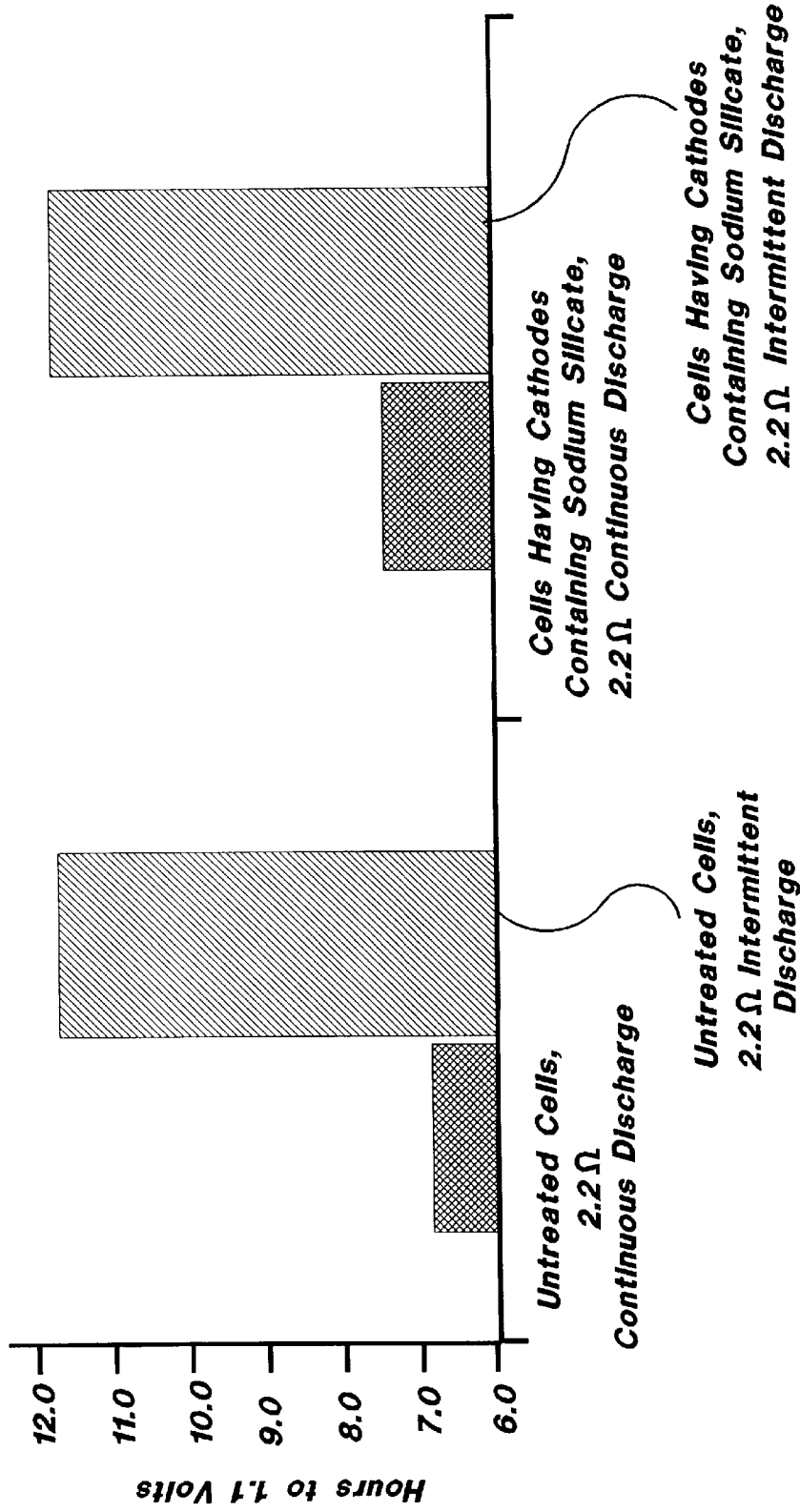
FIG. 16 shows intermittent and continuous discharge test results for coated can cells and cells having cathodes containing sodium silicate after one month of storage under high temperature conditions.

FIGS. 15, 16 and 17 show results obtained with (a) untreated cells and (b) cells made using coated cans not treated with sodium silicate or silicic acid, where the cathodes thereof were made from a cathode mix containing 0.24% by weight sodium silicate, the cathode mix otherwise comprising a standard mix formulation as described above.

FIG. 15 shows HT flash current test results obtained with control cells and cells having cathodes containing sodium silicate. The same HT flash current test procedures described above in Examples 5, 6 and 7 employed in Example 8. FIG. 15 shows that cells having cathodes containing sodium silicate delivered more current than the control cells after about one week had passed. The difference in performance becomes pronounced thereafter.

FIGS. 16 and 17 show 2.2 Ohm LIF test results obtained with untreated cells and cells treated with sodium silicate, where the cells were placed in storage at high temperature (about 130° F.) for one and two months, respectively, removed from storage, and then tested. The same 2.2 Ohm LIF test procedures described above Examples 5 through 7 were employed in Example 8, the results of which appear in FIGS. 16 and 17 as data labeled "2.2 Ω, 1 hour/day". Control cells and cells having cathodes containing sodium metasilicate were also tested by continuously draining current from the cells through a 2.2 Ohm load, and measuring the amount of time for the closed circuit voltage of the tested cell to drop to 1.1 Volts. Those continuous drain test results appear in FIGS. 16 and 17 as data labeled "2.2 Ω, Continuous".

FIG. 16 shows that after one month of high temperature storage, cells having cathodes containing sodium silicate performed better on continuous discharge than did control cells. FIG. 16 also shows that control cells and cells having cathodes containing sodium silicate provided similar results under intermittent discharge conditions.

FIG. 17 shows that after two months of high temperature storage, cells having cathodes containing sodium silicate performed better on continuous and intermittent discharge than did control cells.

From the results in the foregoing examples and the referenced drawings, it is evident that the alkaline cells of this invention are superior to conventional alkaline batteries. Although certain preferred embodiments of the present invention have been described, the spirit and scope of the invention are by no means restricted to what is described above.

For example, the present invention includes within its scope alkaline electrochemical cells having sodium silicate or silicic acid treated coated cans, where the cathodes additionally contain sodium silicate. The present invention also includes within its scope primary and rechargeable alkaline manganese dioxide electrochemical cells.

Those skilled in the art will appreciate readily that many modifications are possible in the exemplary embodiments without materially departing from the novel teachings and advantages of this invention. Accordingly, all such modifications are intended to be included within the scope of this invention as defined in the following claims.

We claim:

1. An alkaline electrochemical cell, comprising
   (a) an unplated cylindrical steel container having an inner surface, a closed first end forming a bottom, an initially open second end, and upstanding sidewalls having an outer surface, the container forming a positive current collector, the inner surface having been treated with an aqueous solution of sodium silicate;
   (b) a cylindrical annular cathode disposed within the container and comprising manganese dioxide, the cathode having outer peripheral sidewalls and inner peripheral sidewalls, the inner peripheral sidewalls forming a central cylindrically shaped void disposed therebetween;

(c) a cylindrical anode having an outer peripheral surface and comprising gelled zinc, the anode being disposed within the central cylindrically shaped void;

(d) an ionically permeable separator interposed between at least a portion of the outer peripheral surface of the anode and the inner peripheral sidewalls of the cathode;

(e) an alkaline aqueous electrolyte comprising potassium hydroxide, the electrolyte at least partially wetting the anode, the cathode, and the separator;

(f) a negative current collector electrically connected to the anode;

(g) a sealing disk disposed over the top of the initially open second end, the disk sealing inside the container the components disposed therewithin; the negative current collector extending through the sealing disk, and (h) a conductive polymeric coating comprising a first film forming binder component and a second component comprising at least one of electrically conductive carbon and an electrically conductive filler, the film forming component of the coating being resistant to chemical reaction with the alkaline electrolyte, the coating being interposed between, and being in electrical contact with, both the outer peripheral sidewalls of the cathode and the inner surface of the container;

wherein the cell delivers more current in respect of another cell having otherwise identical construction but being untreated on the inner surface of its container with an aqueous solution of sodium silicate.

2. The cell of claim 1, wherein a multilayer adhesive label is disposed about the exterior surface of the container.

3. The cell of claim 1, wherein the cathode additionally comprises sodium silicate.

4. The cell of claim 1, wherein the cathode additionally comprises silicic acid.

5. The cell of claim 1, wherein the cell is a primary electrochemical cell.

6. The cell of claim 1, wherein the cell is a rechargeable electrochemical cell.

7. The cell of claim 1, wherein the cell is one of the AAA, AA, C and D sizes.

8. An alkaline electrochemical cell, comprising:

(a) an unplated cylindrical steel container having an inner surface, a closed first end forming a bottom, an initially open second end, and upstanding sidewalls having an exterior surface, the container forming a positive current collector;

(b) a cylindrical annular cathode disposed within the container and comprising manganese dioxide, the cathode having outer peripheral sidewalls and inner peripheral sidewalls, the inner peripheral sidewalls forming a central cylindrically shaped void disposed therebetween;

(c) a cylindrical anode having an outer peripheral surface and comprising gelled zinc, the anode being disposed within the central cylindrically shaped void;

(d) an ionically permeable separator interposed between at least a portion of the outer peripheral surface of the anode and the inner peripheral sidewalls of the cathode;

(e) an alkaline aqueous electrolyte comprising potassium hydroxide, the electrolyte at least partially wetting the anode, the cathode, and the separator;

(f) a negative current collector electrically connected to the anode;

(g) a sealing disk disposed over the top o the initially open second end, the disk sealing inside the container the components disposed therewithin; the negative current collector extending through the sealing disk, and (h) a conductive polymeric coating comprising a first film forming binder component and a second component comprising at least one of electrically conductive carbon and an electrically conductive filler, the film forming component of the coating being resistant to chemical reaction with the alkaline electrolyte, the coating being interposed between, and being in electrical contact with, both the outer peripheral sidewalls of the cathode and the inner surface of the container;

wherein the inner surface of the container is treated with an aqueous solution of sodium silicate after the coating has been disposed thereon and before the cathode is disposed within the container, the cell delivering more current in respect of another cell having otherwise identical construction but being untreated on the inner surface of its container with an aqueous solution of sodium silicate.

9. The cell of claim 8, wherein a multilayer adhesive label is disposed about the exterior surface of the container.

10. The cell of claim 8, wherein the cathode additionally comprises sodium silicate.

11. The cell of claim 8, wherein the cathode additionally comprises silicic acid.

12. The cell of claim 8, wherein the cell is a primary electrochemical cell.

13. The cell of claim 8, wherein the cell is a rechargeable electrochemical cell.

14. The cell of claim 8, wherein the cell is one of the AAA, AA, C and D sizes.

15. An alkaline electrochemical cell, comprising:

(a) an unplated cylindrical steel container having an inner surface, a closed first end forming a bottom, an initially open second end, and upstanding sidewalls having an exterior surface, the container forming a positive current collector;

(b) a cylindrical annular cathode disposed within the container and comprising manganese dioxide, the cathode having outer peripheral sidewalls and inner peripheral sidewalls, the inner peripheral sidewalls forming a central cylindrically shaped void disposed therebetween;

(c) a cylindrical anode having an outer peripheral surface and comprising gelled zinc, the anode being disposed within the central cylindrically shaped void;

(d) an ionically permeable separator interposed between at least a portion of the outer peripheral surface of the anode and the inner peripheral sidewalls of the cathode;

(e) an alkaline aqueous electrolyte comprising potassium hydroxide, the electrolyte at least partially wetting the anode, the cathode, and the separator;

(f) a negative current collector electrically connected to the anode;

(g) a sealing disk disposed over the top of the initially open second end, the disk sealing inside the container the components disposed therewithin; the negative current collector extending through the sealing disk, and (h) a conductive polymeric coating comprising one of silicic acid and sodium silicate, a first film forming binder component and a second component comprising at least one of electrically conductive carbon and an electrically conductive filler, the film forming component of the coating being resistant to chemical reaction with the alkaline electrolyte, the coating being interposed between, and being in electrical contact with, both the outer peripheral sidewalls of the cathode and the inner surface of the container;

wherein the cell has a lower internal resistance in respect of another cell having otherwise identical construction but having no conductive polymeric coating disposed on the inner surface of its container.

16. The cell of claim 15, wherein a multilayer adhesive label is disposed about the exterior surface of the container.

17. The cell of claim 15, wherein the cathode additionally comprises sodium silicate.

18. The cell of claim 15, wherein the cathode additionally comprises silicic acid.

19. The cell of claim 15, wherein the cell is a primary electrochemical cell.

20. The cell of claim 15, wherein the cell is a rechargeable electrochemical cell.

21. The cell of claim 15, wherein the cell is one of the AAA, AA, C and D sizes.

* * * * *